(12) United States Patent
Shirakawa et al.

(10) Patent No.: US 10,684,594 B2
(45) Date of Patent: Jun. 16, 2020

(54) MACHINE LEARNING DEVICE, SERVO MOTOR CONTROLLER, SERVO MOTOR CONTROL SYSTEM, AND MACHINE LEARNING METHOD

(71) Applicant: FANUC CORPORATION, Minamitsuru-gun, Yamanashi (JP)

(72) Inventors: Yuuki Shirakawa, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1 day.

(21) Appl. No.: 16/268,970

(22) Filed: Feb. 6, 2019

(65) Prior Publication Data

US 2019/0243318 A1 Aug. 8, 2019

(30) Foreign Application Priority Data

Feb. 8, 2018 (JP) .................................. 2018-020919

(51) Int. Cl.
*G05B 19/10* (2006.01)
*G05B 13/02* (2006.01)
*G05B 19/414* (2006.01)

(52) U.S. Cl.
CPC ..... *G05B 13/0285* (2013.01); *G05B 19/4141* (2013.01); *G05B 2219/42152* (2013.01)

(58) Field of Classification Search
CPC .................. G05B 13/0285; G05B 19/4141
USPC ........................................................ 318/567
See application file for complete search history.

(56) References Cited

FOREIGN PATENT DOCUMENTS

| JP | 9-84400 | 3/1997 |
| JP | 2017-46487 | 3/2017 |
| JP | 2017-139892 | 8/2017 |
| JP | 2018-14838 | 1/2018 |

OTHER PUBLICATIONS

Notification of Reasons for Refusal dated Dec. 3, 2019 in Japanese Patent Application No. 2018-020919.

*Primary Examiner* — Erick D Glass
(74) *Attorney, Agent, or Firm* — Wenderoth, Lind & Ponack, L.L.P.

(57) ABSTRACT

A machine learning device performs machine learning with respect to a servo motor controller that converts a three-phase current to a two-phase current of the d- and q-phase. The machine learning device includes: a state information acquisition unit configured to acquire, from the servo motor controller, state information including velocity or a velocity command, reactive current, and an effective current command and effective current or a voltage command; an action information output unit configured to output action information including a reactive current command to the servo motor controller; a reward output unit configured to output a value of a reward of reinforcement learning based on the voltage command or the effective current command and the effective current; and a value function updating unit configured to update a value function on the basis of the output value of the reward, the state information, and the action information.

8 Claims, 10 Drawing Sheets

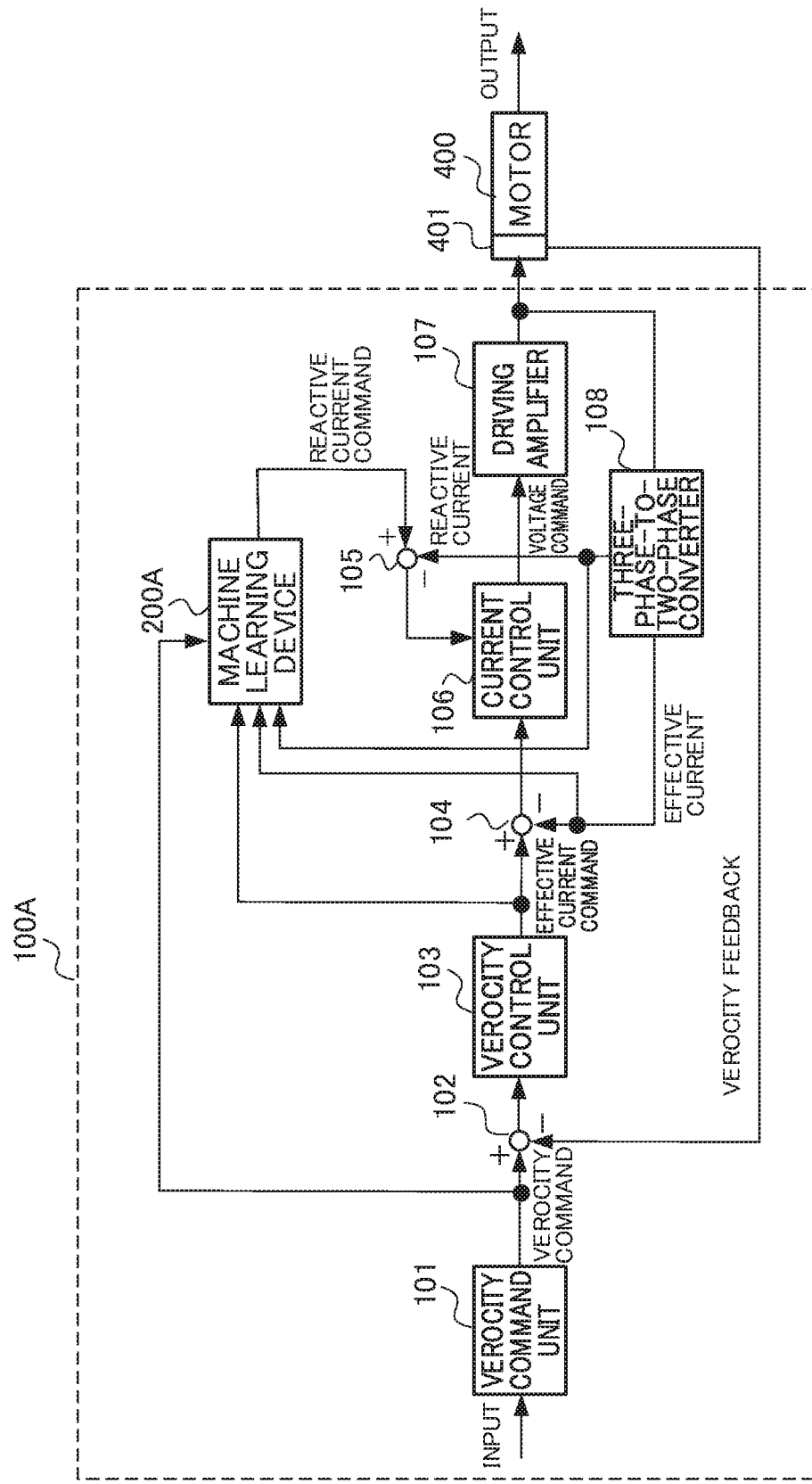

MACHINE LEARNING DEVICE, SERVO MOTOR CONTROLLER, SERVO MOTOR CONTROL SYSTEM, AND MACHINE LEARNING METHOD

This application is based on and claims the benefit of priority from Japanese Patent Application No. 2018-020919, filed on 8 Feb. 2018, the content of which is incorporated herein by reference.

BACKGROUND OF THE INVENTION

Field of the Invention

The present invention relates to a machine learning device that performs learning related to a reactive current command with respect to a servo motor controller that performs current control on a servo motor and relates to a servo motor controller and a servo motor control system including the machine learning device and a machine learning method.

Related Art

As an example of a conventional servo motor controller, a servo motor controller disclosed in Patent Document 1 is known. The servo motor controller converts a three-phase current to a two-phase current (d- and q-phase current), does not supply a reactive current to the d-phase to suppress generation of heat due to a reactive current in a rotation velocity region in which a voltage saturation does not occur, and supplies a reactive current to the d-phase to reduce counter-electromotive force to realize stable rotation control in a high-velocity rotation region in which a voltage saturation occurs.

Patent Document 1: Japanese Unexamined Patent Application, Publication No. H09-84400

SUMMARY OF THE INVENTION

The servo motor controller disclosed in Patent Document 1 sets a velocity in the vicinity of a velocity at which a voltage saturation starts as a base velocity, sets a boundary velocity at which failures resulting from generation of heat due to increase in reactive current are allowable as a clamp velocity, and controls a reactive current using the base velocity and the clamp velocity as boundary velocities. Specifically, the servo motor controller of Patent Document 1 sets a d-phase current command (serving as a reactive current command) for supplying a reactive current to zero in a velocity region in which a rotation velocity of a motor is between 0 and the base velocity. Moreover, the servo motor controller disclosed in Patent Document 1 increases the d-phase current command in proportion to a rotation velocity in a high-velocity region in which the rotation velocity exceeds the base velocity and fixes the d-phase current command to a fixed value in a high-velocity region in which the rotation velocity exceeds the clamp velocity. However, the servo motor controller disclosed in Patent Document 1 needs to set the base velocity and the clamp velocity for respective servo motor controllers, and the setting operation is complex. Moreover, when the base velocity or the clamp velocity changes due to aging, the servo motor controller needs to change the setting of the base velocity or the clamp velocity.

An object of the present invention is to provide a machine learning device, a servo motor controller, a servo motor control system, and a machine learning method capable of calculating a reactive current command appropriate for a rotation velocity of a motor by machine learning without setting a base velocity and a clamp velocity in advance to avoid saturation of a voltage command.

(1) A machine learning device (for example, a machine learning device 200 to be described later) according to the present invention is a machine learning device that performs machine learning with respect to a servo motor controller (for example, a servo motor controller 100 to be described later) configured to convert a three-phase current to a two-phase current of the d- and q-phases to perform current control on a servo motor, the machine learning device including: a state information acquisition unit (for example, a state information acquisition unit 201 to be described later) configured to acquire, from the servo motor controller, state information including at least velocity or a velocity command, reactive current, and an effective current command and effective current or a voltage command, by causing the servo motor controller to execute a predetermined program; an action information output unit (for example, an action information output unit 203 to be described later) configured to output action information including a reactive current command to the servo motor controller; a reward output unit (for example, a reward output unit 2021 to be described later) configured to output a value of a reward of reinforcement learning based on the voltage command or the effective current command and the effective current included in the state information; and a value function updating unit (for example, a value function updating unit 2022 to be described later) configured to update a value function on the basis of the value of the reward output by the reward output unit, the state information, and the action information.

(2) In the machine learning device according to (1), the reward output unit may determine the value of the reward on the basis of whether a voltage saturation occurs.

(3) In the machine learning device according to (2), wherein the voltage saturation may be detected on the basis of whether the voltage command exceeds a DC link voltage or an error between the effective current and the effective current command.

(4) In the machine learning device according to any one of claims (1) to (3), the reward output unit may determine the reward and determines a reward on the basis of the reactive current value when the voltage saturation does not occur.

(5) The machine learning device according to any one of claims (1) to (4) may further include: an optimization action information output unit (for example, an optimization action information output unit 205 to be described later) configured to generate and output the reactive current command on the basis of the value function updated by the value function updating unit.

(6) A servo motor control system according to the present invention is a servo motor control system including: the machine learning device (for example, the machine learning device 200 to be described later) according to any one of claims (1) to (5); and a servo motor controller (for example, a servo motor controller 100 to be described later) configured to convert a three-phase current to a two-phase current of the d- and q-phases to perform current control of a servo motor.

(7) A servo motor controller according to the present invention is a servo motor controller including the machine learning device according to any one of (1) to (5), the servo motor controller converting a three-phase current to a two-phase current of the d- and q-phases to perform current control on a servo motor.

(8) A machine learning method according to the present invention is a machine learning method of a machine learning device (for example, a machine learning device 200 to be described later) that performs machine learning with respect to a servo motor controller (for example, a servo motor controller 100 to be described later) configured to convert a three-phase current to a two-phase current of the d- and q-phases to perform current control on a servo motor, the machine learning method including: acquiring, from the servo motor controller, state information including at least velocity or a velocity command, reactive current, and an effective current command and effective current or a voltage command, by causing the servo motor controller to execute a predetermined program; outputting action information including a reactive current command to the servo motor controller; updating a value function on the basis of the state information, the action information, and a value of a reward of reinforcement learning based on the voltage command or the effective current command and the effective current included in the state information.

According to the present invention, it is possible to calculate a reactive current command appropriate for a rotation velocity of a motor by machine learning without setting a base velocity and a clamp velocity in advance to avoid saturation of a voltage command.

BRIEF DESCRIPTION OF THE DRAWINGS

FIG. 10 is a block diagram illustrating a motor and a servo motor controller according to an embodiment of the present invention.

DETAILED DESCRIPTION OF THE INVENTION

Figure 1:
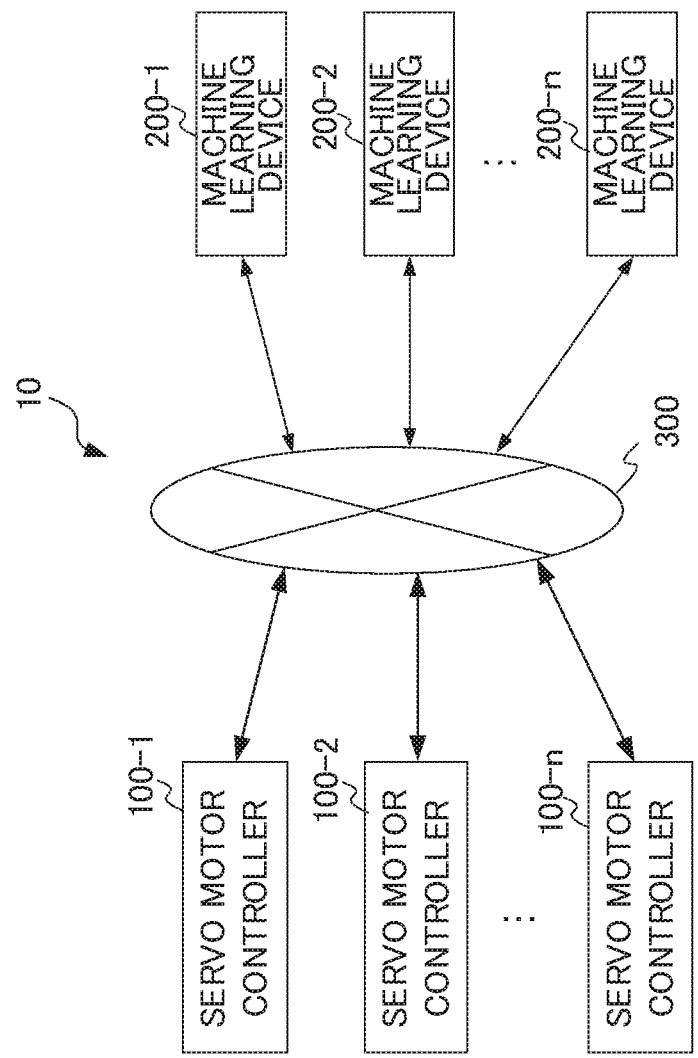
FIG. 1 is a block diagram illustrating a servo motor control system according to an embodiment of the present invention.

Hereinafter, embodiments of the present invention will be described in detail with reference to the drawings. FIG. 1 is a block diagram illustrating a servo motor control system according to an embodiment of the present invention. As illustrated in FIG. 1, a servo motor control system 10 includes n servo motor controllers 100-1 to 100-n, n machine learning devices 200-1 to 200-n, and a network 300. Here, n is an arbitrary natural number.

Here, the servo motor controller 100-1 and the machine learning device 200-1 are paired in a one-to-one relationship and are communicably connected. The servo motor controllers 100-2 to 100-n and the machine learning devices 200-2 to 200-n are connected similarly to the servo motor controller 100-1 and the machine learning device 200-1. In FIG. 1, n pairs of servo motor controllers 100-1 to 100-n and machine learning devices 200-1 to 200-n are connected via the network 300. Although the n pairs of the servo motor controllers 100-1 to 100-n and the machine learning devices 200-1 to 200-n may be connected directly via connection interfaces, respectively. A plurality of n pairs of the servo motor controllers 100-1 to 100-n and the machine learning devices 200-1 to 200-n may be provided in the same plant, for example, and may be provided in different plants.

The network 300 is a local area network (LAN) constructed in a plant, the Internet, a public telephone network, a direct connection via a connection interface, or a combination thereof, for example. A specific communication scheme of the network 300, whether the network uses a cable connection or a wireless connection, and the like are not particularly limited.

Figure 2:
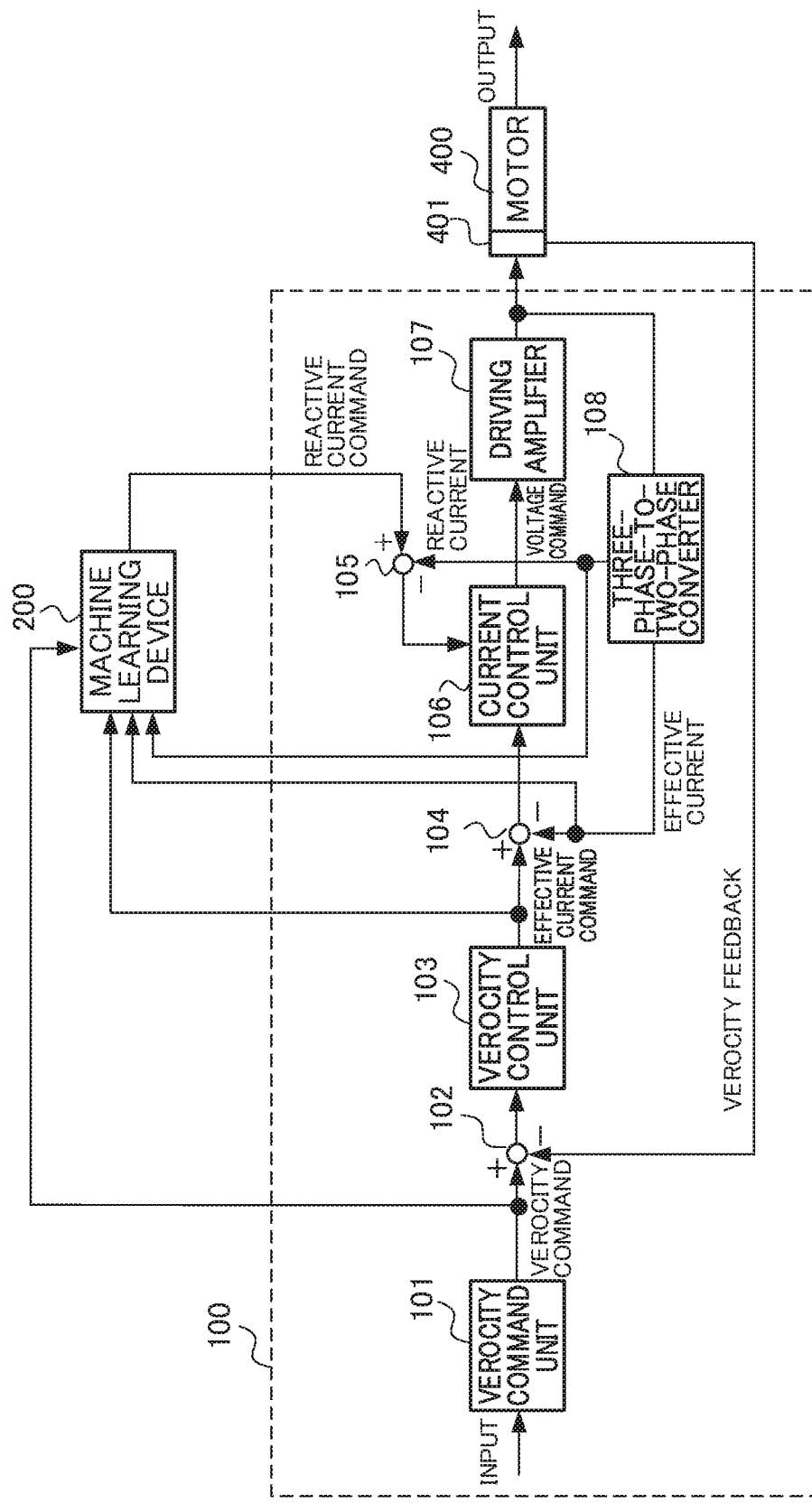
FIG. 2 is a block diagram illustrating a motor and a pair made up of a servo motor controller and a machine learning device of the servo motor control system according to an embodiment of the present invention.

FIG. 2 is a block diagram illustrating a motor and the pair made up of the servo motor controller and the machine learning device of the servo motor control system according to the embodiment of the present invention. The servo motor controller 100 and the machine learning device 200 in FIG. 2 correspond to the servo motor controller 100-1 and the machine learning device 200-1 illustrated in FIG. 1, for example. The servo motor controller 100 controls rotation of a servo motor 400. The servo motor 400 is an AC servo motor driven with a three-phase current, for example. The servo motor controller 100 converts a three-phase current to a two-phase current (d- and q-phase current) and controls current for driving the servo motor 400. The servo motor 400 is included in machine tools, robots, or industrial machines, for example. The servo motor controller 100 may be provided as part of a machine tool, a robot, or an industrial machine. The machine learning device 200 receives a velocity command, an effective current command, effective current, and reactive current from the servo motor controller 100 and outputs a reactive current command to the servo motor controller 100. As will be described later, the machine learning device 200 may use a velocity-feedback detection velocity instead of the velocity command and may use a voltage command instead of the effective current command and the q-phase effective current.

When the servo motor 400 is included in a machine tool and the servo motor controller 100 moves a table having a workpiece (a work) mounted thereon with the aid of the servo motor 400 in an X-axis direction and a Y-axis direction, the servo motor controller 100 is provided in each of the X-axis direction and the Y-axis direction. When the table is moved in directions of three or more axes, the servo motor controller 100 is provided in each of the respective axial directions. When the servo motor controller 100 moves a spindle that machines a workpiece (a work) with the aid of the servo motor 400, the servo motor controller 100 is provided in the spindle.

First, a configuration of the servo motor controller 100 will be described. As illustrated in FIG. 2, the servo motor controller 100 includes a velocity command unit 101, a subtractor 102, a velocity control unit 103, a subtractor 104, a subtractor 105, a current control unit 106, a driving amplifier 107, and a three-phase-to-two-phase converter 108.

The velocity command unit 101 outputs a value obtained by multiplying a predetermined position gain Kp with an input position command to the subtractor 102 and the machine learning device 200 as a velocity command. The position command is generated according to a predetermined program input from a host controller, an external input device, or the like so as to change a pulse frequency in order to change the velocity of the servo motor 400. The subtractor 102 calculates a difference between the velocity command and a velocity-feedback detection velocity and outputs the difference to the velocity control unit 103 as a velocity error.

The velocity control unit 103 adds a value obtained by multiplying and integrating a predetermined integral gain $K1v$ with the velocity error to a value obtained by multiplying a predetermined proportional gain $K2v$ with the velocity error and outputs the addition value to the subtractor 104 and the machine learning device 200 as an effective current command, for example.

The subtractor 104 calculates a difference between the effective current command and an output of the three-phase-to-two-phase converter 108 and outputs the difference to the current control unit 106 as an effective current error.

The subtractor 105 calculates a difference between the reactive current command output from the machine learning device 200 and the reactive current output from the three-phase-to-two-phase converter 108 and outputs the difference to the current control unit 106 as a reactive current error.

The current control unit 106 includes an effective current controller (not illustrated), a reactive current controller (not illustrated), and a two-phase-to-three-phase converter (not illustrated). Here, the effective current controller adds a value obtained by multiplying and integrating a predetermined integral gain $K1c$ with the effective current error output from the subtractor 104 and a value obtained by multiplying a predetermined proportional gain $K2c$ with the effective current error and outputs the addition value to the two-phase-to-three-phase converter as an active command voltage. The reactive current controller adds a value obtained by multiplying and integrating a predetermined integral gain $K3c$ with the reactive current error output from the subtractor 105 and a value obtained by multiplying a predetermined proportional gain $K4c$ with the reactive current error and outputs the addition value to the two-phase-to-three-phase converter as a reactive command voltage. The two-phase-to-three-phase converter generates a three-phase command voltage from the two-phase active command voltage and the two-phase reactive command voltage and outputs the three-phase command voltage to the driving amplifier 107. These configurations are known to those skilled in the art (see Patent Document 1, for example), and the detailed description thereof will be omitted.

The driving amplifier 107 supplies a current corresponding to the three-phase command voltage to the respective phases of the servo motor 400 using an inverter or the like to control the servo motor 400. The driving amplifier 107 outputs a three-phase current to the three-phase-to-two-phase converter 108.

The three-phase-to-two-phase converter 108 obtains an effective current from the three-phase current and outputs the effective current to the subtractor 104 and the machine learning device 200. The three-phase-to-two-phase converter 108 obtains a reactive current from the three-phase current and outputs the reactive current to the subtractor 105 and the machine learning device 200.

A rotation angle position of the servo motor 400 is detected by a rotary encoder 401 serving as a position detection unit, associated with the servo motor 400, and the detected velocity (a detection velocity) is input to the subtractor 102 as a velocity feedback.

<Machine Learning Device 200>

Next, a configuration of the machine learning device 200 will be described. The machine learning device 200 learns a reactive current command for avoiding saturation of a voltage command with a reactive current as small as possible while improving the response-following ability of the effective current when the servo motor 400 is driven on the basis of a program. The program is a program that is actually used. The program is an actual machining program used for machining a workpiece (a work) when the servo motor controller is used in a machine tool, for example. A voltage saturation occurs in a normal operation of driving the servo motor controller 100 according to a program. A voltage saturation in the servo motor controller 100 is detected when a voltage command exceeds a DC link voltage or when an effective current command and an effective current feedback are not identical but an error occurs. In the following description, a case of detecting a voltage saturation on the basis of whether an effective current command and an effective current feedback are not identical but an error occurs will be described. As described in Patent Document 1, a voltage saturation occurs in a servo motor controller in a high-velocity rotation region of a servo motor. Whether the servo motor controller 100 operates in such a high-velocity rotation region that a voltage saturation will occur can be detected on the basis of a velocity command or a detection velocity fed back from the servo motor 400.

Prior to description of respective functional blocks included in the machine learning device 200, first, a basic mechanism of reinforcement learning will be described. An agent (corresponding to the machine learning device 200 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for reducing a positional error, is obtained.

Here, although an arbitrary learning method is used as the reinforcement learning, in the description below, Q-learning which is a method of learning a value function $Q(S,A)$ of selecting an action A under a certain environment state S will be described as an example. An object of the Q-learning is to select an action A having the highest value function $Q(S,A)$ as an optimal action among actions A that can be taken in a certain state S.

However, at an initial time at which the Q-learning starts, the correct value of the value $Q(S,A)$ is not known at all for a combination of the state S and the action A. Therefore, the agent learns the correct value Q(S,A) by selecting various actions A under a certain state S and selecting a better action on the basis of rewards given for the selected actions A.

Since an agent wants to maximize a total reward obtained in the future, the Q-learning aims to finally attain a relation of Q(S,A)=E[Σ(γ$^t$)r$_t$]. Here, E[ ] indicates an expected value, t indicates time, γ is a parameter called a discount factor to be described later, r$_t$ is a reward at time t, and Σ is the sum at time t. In this expression, the expected value is an expected value when the state was changed according to an optimal action. However, since it is unclear which action is optimal in the process of Q-learning, reinforcement learning is performed while searching for an optimal action by performing various actions. An update expression of such a value Q(S,A) can be represented by Expression 1 below (Math. 1).

$$Q(S_{t+1}, A_{t+1}) \leftarrow Q(S_t, A_t) + \alpha \left( r_{t+1} + \gamma \max_A Q(S_{t+1}, A) - Q(S_t, A_t) \right) \quad [\text{Math. 1}]$$

In Expression 1, S$_t$ indicates an environment state at time t, and A$_t$ indicates an action at time t. By the action A$_t$, the state changes to S$_{t+1}$.

r$_{t+1}$ indicates a reward obtained by the change in the state. Moreover, a term with max is a multiplication of the Q value by γ when an action A having the highest Q value known at that moment was selected under the state S$_{t+1}$. Here, γ is a parameter of 0<γ≤1 and is called a discount rate. Moreover, α is a learning coefficient and is in the range of 0<α≤1.

Expression 1 indicates a method of updating a value Q(S$_t$,A$_t$) of an action A$_t$ in a state S$_t$ on the basis of a returning reward r$_{t+1}$ when the action A$_t$ is performed. This update expression indicates that if the value max$_a$ Q(S$_{t+1}$,A) of the best action in the next state S$_{t+1}$ associated with an action At is larger than the value Q(S$_t$,A$_t$) of an action A$_t$ in the state S$_t$, Q(S$_t$,A$_t$) is increased, and if otherwise, Q(S$_t$,A$_t$) is decreased. That is, the value of a certain action in a certain state approaches the value of the best action in the next state associated with the action. However, although this difference differs depending on the discount rate γ and the reward r$_{t+1}$, the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to converge when the values of the value functions Q(S,A) of all state-action pairs are to be calculated since the number of states is too large.

Thus, Q-learning may use an existing technique called a deep Q-network (DQN). Specifically, the value of the value Q(S,A) may be calculated by constructing a value function Q using an appropriate neural network and approximating the value function Q with the appropriate neural network by adjusting the processes of the neural network. By using DQN, it is possible to shorten the time required for convergence of Q-learning. The details of DQN are disclosed in Non-Patent Document below, for example.

Non-Patent Document

"Human-level control through deep reinforcement learning", Volodymyr Mnihl [online], [searched on Jan. 17, 2017], Internet <URL: http://files.davidqiu.com/research/nature14236.pdf>

The machine learning device 200 performs the above-described Q-learning. Specifically, the machine learning device 200 learns a value function Q of selecting an action A of adjusting a reactive current command associated with a servo state S such as commands and feedback information acquired by executing a program. Examples of the commands include the velocity command and the effective current command in the servo motor controller 100. Moreover, examples of the feedback information include the q-phase effective current and the d-phase reactive current.

The machine learning device 200 observes the state information S including the servo state such as the commands and the feedback information of the servo motor controller 100 obtained by executing a program on the basis of a reactive current command to determine the action A (the reactive current command). The machine learning device 200 returns a reward whenever the action A is executed. The machine learning device 200 searches for the optimal action A so that a total future reward is maximized by trial-and-error learning. By doing so, the machine learning device 200 can select the optimal action A (that is, the reactive current command optimal to the servo motor controller 100) with respect to the state S including the servo state such as the commands and the feedback information of the servo motor controller 100 acquired by executing a program on the basis of the reactive current command.

That is, the machine learning device 200 selects such an action A that maximizes the Q value among actions A to be applied to the reactive current associated with a certain state S on the basis of the learned value function Q. By selecting such an action A, the machine learning device 200 can select such an action A (that is, the reactive current command of the servo motor controller 100) that minimizes an error between the effective current command and the effective current feedback acquired by executing a program.

Figure 3:
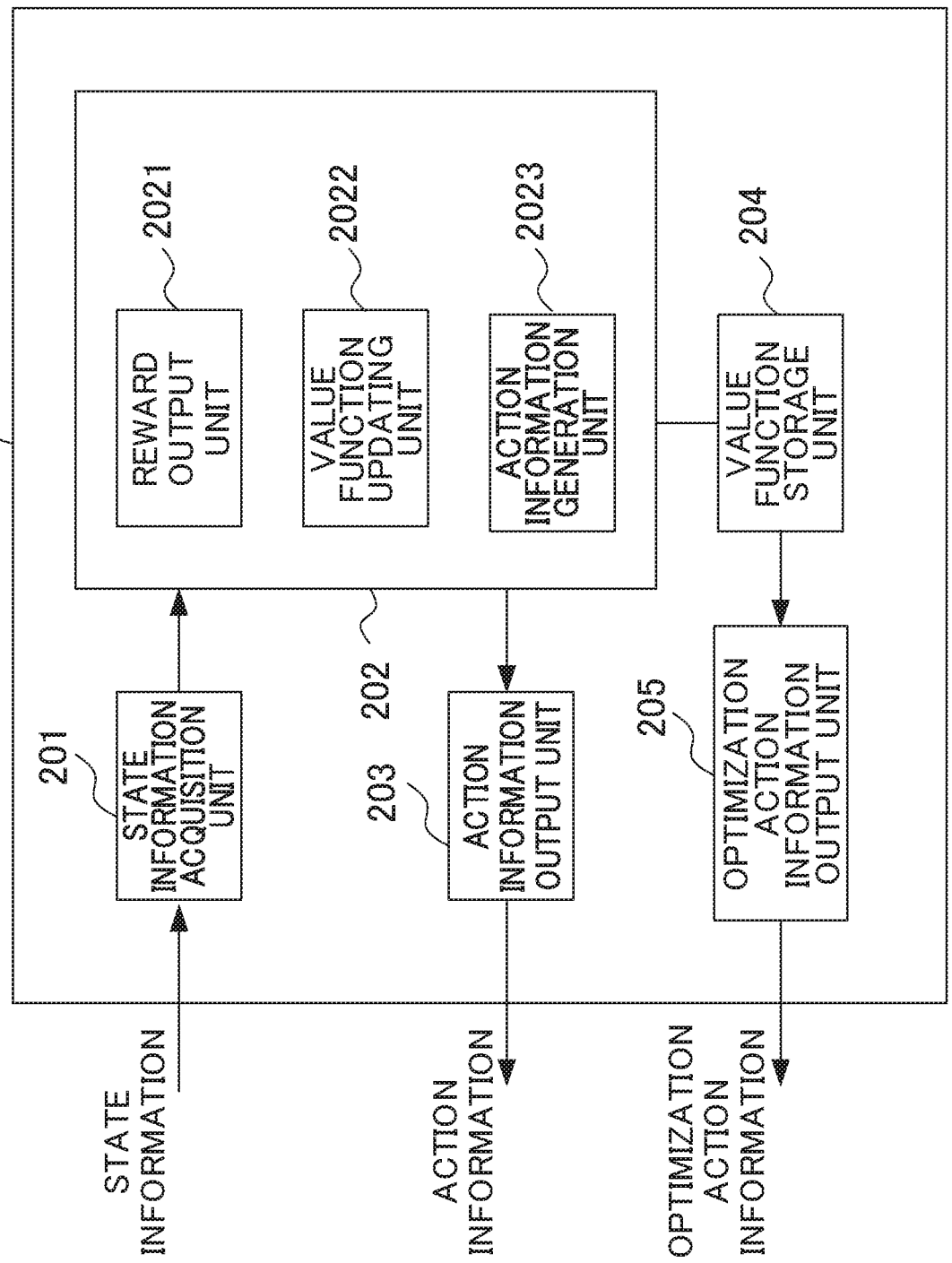
FIG. 3 is a block diagram illustrating a machine learning device 200 according to an embodiment of the present invention.

FIG. 3 is a block diagram illustrating the machine learning device 200 according to the embodiment of the present invention. As illustrated in FIG. 3, in order to perform the reinforcement learning, the machine learning device 200 includes a state information acquisition unit 201, a learning unit 202, an action information output unit 203, a value function storage unit 204, and an optimization action information output unit 205.

The state information acquisition unit 201 acquires, from the servo motor controller 100, the state S including the servo state such as the commands and the feedback information of the servo motor controller 100 acquired by executing a program on the basis of the reactive current command output to the servo motor controller 100. Examples of the commands include a velocity command and an effective current command, and examples of the feedback information include an effective current and a reactive current. The state information S corresponds to the environment state S in the Q-learning. The state information acquisition unit 201 outputs the acquired state information S to the learning unit 202. The reactive current command at a time point at which the Q-learning starts initially may be generated by a user in advance. In the present embodiment, for example, the initial setting value of the reactive current command created by the user is adjusted to an optimal value by the reinforcement learning.

The learning unit 202 is a unit that learns the value function Q(S,A) when a certain action A is selected under a certain environment state S. Specifically, the learning unit 202 includes a reward output unit 2021, a value function updating unit 2022, and an action information generation unit 2023.

The reward output unit 2021 is a unit that calculates a reward when the action A is selected under a certain state S. In the present embodiment, the reward output unit 2021 determines a reward on the basis of an error between an effective current and an effective current command. When a state S transitions to a state S' due to an action A, the reward output unit 2021 calculated an error between an effective current and an effective current command in the states S and S'. The error between the effective current and the effective current command may be acquired by the state information acquisition unit 201 on the basis of the output of the subtractor 104 of the servo motor controller 100. The reward output unit 2021 calculates a reward on the basis of an error between the effective current and the effective current command by the following processes (a), (b), and (c).

(a) When an effective current is identical to (does not deviate from) an effective current command in the state S' or the error thereof is within a predetermined range, the reward output unit 2021 sets the reward to a first positive value. When the effective current is identical to (does not deviate from) the effective current command, a voltage saturation does not occur. Even when the effective current is not completely identical to the effective current command, if the error thereof is within a predetermined range of the effective current commands, it is determined that a voltage saturation does not occur. On the other hand, as in the processes (b) and (c), when the error between the effective current and the effective current command exceeds the predetermined range, it is determined that a voltage saturation occurs.

(b) When it is determined that an error L(S') between the effective current and the effective current command in the state S' exceeds the predetermined range, and the error is identical to or smaller than an error L(S) between the effective current and the effective current command in the state S, the reward output unit 2021 sets the reward to 0 or a first negative value.

(c) When it is determined that an error L(S') between the effective current and the effective current command in the state S' exceeds the predetermined range, and the error is larger than an error L(S) between the effective current and the effective current command in the state S, the reward output unit 2021 sets the reward to a second negative value. The second negative value has a larger absolute value than the first negative value.

When the error L(S') in the state S' after execution of the action A is larger than the error L(S) in the previous state S, the absolute value of the second negative value may be increased proportionally. That is, the absolute value of the second negative value may be increased according to the degree of increase in the error between the effective current and the effective current command. In contrast, when the error L(S') of the state S' after execution of the action A is smaller than the error L(S) in the previous state S, the absolute value of the first negative value may be decreased proportionally. That is, the absolute value of the first negative value may be increased according to the degree of decrease in the error between the effective current and the effective current command. The reward is an example and is not limited thereto. For example, in the process (b), the reward may be a positive value smaller than the first positive value rather than 0 of the first negative value. When the reward in the process (b) is set to a positive value, the reward in the process (c) may be set to 0 or the first negative value.

As described above, by giving a reward, the reactive current command is learned so that the error between the effective current and the effective current command decreases. When the reactive current increases due to the reactive current command, the error between the effective current and the effective current command decreases and the voltage saturation is not likely to occur. However, when the reactive current increases, generation of heat due to the reactive current may occur. In order to suppress generation of heat due to the reactive current when a voltage saturation does not occur, the reward output unit 2021 can calculate a reward on the basis of the reactive current value and add the calculated reward to the reward based on the error between the effective current and the effective current command. By adding the reward based on the reactive current value, the reactive current command is leaned so as to decrease the reactive current and generation of heat due to the reactive current is suppressed. The reward output unit 2021 determines the reward on the basis of the reactive current value and adds the reward to the first positive value according to the following processes (d) and (e).

(d) When the reactive current in the state S' is smaller than the reactive current in the state S, the reward output unit 2021 sets the reward to a second positive value and adds the reward to the first positive value.

(e) When the reactive current in the state S' is larger than or the same as the reactive current in the state S, the reward output unit 2021 sets the reward to 0 or a third negative value and adds the reward to the first positive value. The first positive value is preferably larger than the second positive value, and the absolute values of the first and second negative values are preferably larger than the absolute value of the third negative value. This is because, when a voltage saturation occurs, it becomes difficult to control the servo motor controller and the voltage saturation has a greater influence than the generation of heat due to the reactive current. The reward is an example and is not limited thereto. For example, in the process (e), the reward may be a positive value smaller than the second positive value rather than 0 or the third negative value.

The value function updating unit 2022 updates the value function Q stored in the value function storage unit 204 by performing Q-learning on the basis of the state S, the action A, the state S' when the action A was applied to the state S, and the value of the reward calculated in this manner. The update of the value function Q is performed basically by online learning.

Online learning is a learning method of applying a certain action A to a present state S and updating the value function Q immediately whenever the present state S transitions to a new state S'. By using the online learning, the machine learning device 200 can perform learning on a real-time basis and output a more preferable reactive current command by executing a program. However, when a machining process is performed preliminarily before actual machining of a machine tool is performed, the update of the value function Q may be performed by batch learning or mini-batch learning. Batch learning is a learning method of applying a certain action A to a present state S and repeated attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generating unit 2023 selects the action A in the process of Q-learning with respect to the present state S. The action information generation unit 2023 generates action information A and outputs the generated action information A to the action information output unit 203 in order to perform an operation (corresponding to the action A of Q-learning) of correcting the reactive current command of the servo motor controller 100 in the process of Q-learning. More specifically, the action information generation unit 2023 increases or decreases the value of the reactive current command included in the action A with respect to the reactive current command included in the state S, for example.

When the value of the reactive current command is increased or decreased, the state S transitions to the state S', and a plus reward (a positive reward) is returned, the action information generation unit 2023 may select a policy of selecting such an action A' that further suppresses the occurrence of a voltage saturation such as incrementally increasing the reactive current command similarly to the previous action as the next action A'.

In contrast, when a minus reward (a negative reward) is returned, the action information generation unit 2023 may select a policy of selecting such an action A' that decreases the magnitude of the voltage saturation to be smaller than the previous value such as incrementally increasing the reactive current command contrarily to the previous action as the next action A', for example.

The action information generation unit 2023 may select a policy of selecting the action A' according to a known method such as a greedy method of selecting an action A' having the highest value function Q(S,A) among the values of presently estimated actions A and an e-greedy method of randomly selecting an action A' with a certain small probability e and selecting an action A' having the highest value function Q(S,A) in other cases.

The action information output unit 203 is a unit that the action information A output from the learning unit 202 to the changing unit 206 of the servo motor controller 100. As described above, the servo motor controller 100 finely adjusts the present state S (that is, the presently set reactive current command) on the basis of the action information to thereby transition to the next state S' (that is, the corrected reactive current command).

The value function storage unit 204 is a storage device that stores the value function Q. The value function Q may be stored as a table (hereinafter referred to as an action value table) for each sate S and each action A, for example. The value function Q stored in the value function storage unit 204 is updated by the value function updating unit 2022. Moreover, the value function Q stored in the value function storage unit 204 may be shared with other machine learning devices 200. When the value function Q is shared by a plurality of machine learning devices 200, since reinforcement learning can be performed in a manner of being distributed to the respective machine learning devices 200, it is possible to improve the reinforcement learning efficiency.

The optimization action information output unit 205 generates the action information A (hereinafter referred to as "optimization action information") for causing the servo motor controller 100 to perform an operation of maximizing the value function Q(S,A) on the basis of the value function Q updated by the value function updating unit 2022 performing the Q-learning. More specifically, the optimization action information output unit 205 acquires the value function Q stored in the value function storage unit 204. As described above, the value function Q is updated by the value function updating unit 2022 performing the Q-learning. The optimization action information output unit 205 generates the action information on the basis of the value function Q and outputs the generated action information to the servo motor controller 100 (the changing unit 206). The optimization action information includes information that corrects the reactive current command similarly to the action information that the action information output unit 203 outputs in the process of Q-learning.

In the servo motor controller 100, the reactive current command is corrected on the basis of the action information so that a voltage saturation does not occur easily. As described above, by using the machine learning device 200 according to the present embodiment, it is possible to simplify adjustment of the reactive current command in the servo motor controller 100.

Hereinabove, the functional blocks included in the servo motor controller 100 and the machine learning device 200 have been described. In order to realize these functional blocks, the servo motor controller 100 and the machine learning device 200 each include an arithmetic processing unit such as a central processing unit (CPU). The servo motor controller 100 and the machine learning device 200 each further include an auxiliary storage device such as a hard disk drive (HDD) for storing various control programs such as application software or an operating system (OS) and a main storage device such as a random access memory (RAM) for storing data temporarily required when the arithmetic processing device executes a program.

In each of the servo motor controller 100 and the machine learning device 200, the arithmetic processing device reads an application and an OS from the auxiliary storage device, and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 200 involves a large amount of computation associated with the machine learning, it is desirable to mount graphics processing units (GPUs) on a personal computer, for example, and use a technique called general-purpose computing on graphics processing units (GPGPUs). When the GPU is used for arithmetic processing associated with the machine learning, high velocity processing can be performed. Furthermore, in order for the machine learning device 200 to perform higher velocity processing, a computer cluster may be built using a plurality of computers equipped with such GPUs, and the plurality of computers included in the computer cluster may perform parallel processing.

Figure 4:
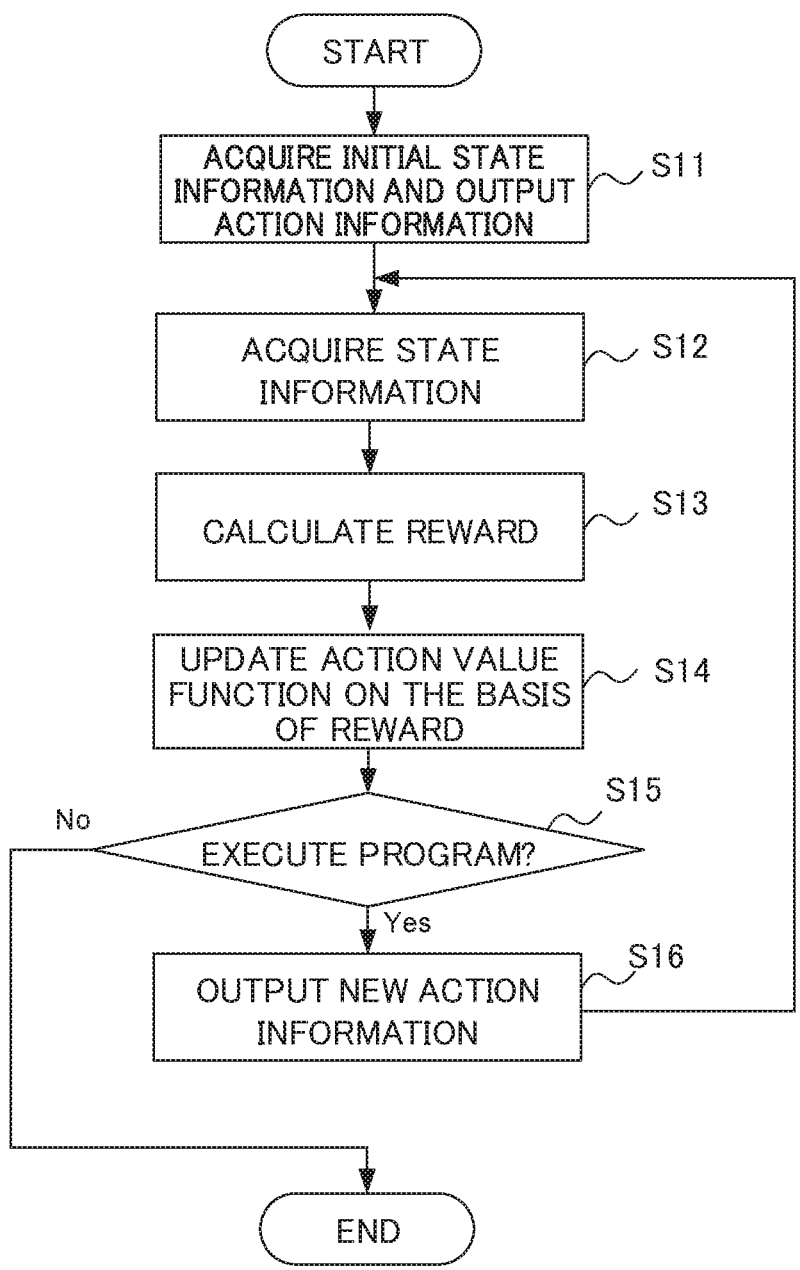
FIG. 4 is a flowchart illustrating an operation of the machine learning device 200 during Q-learning according to the present embodiment.
Figure 5:
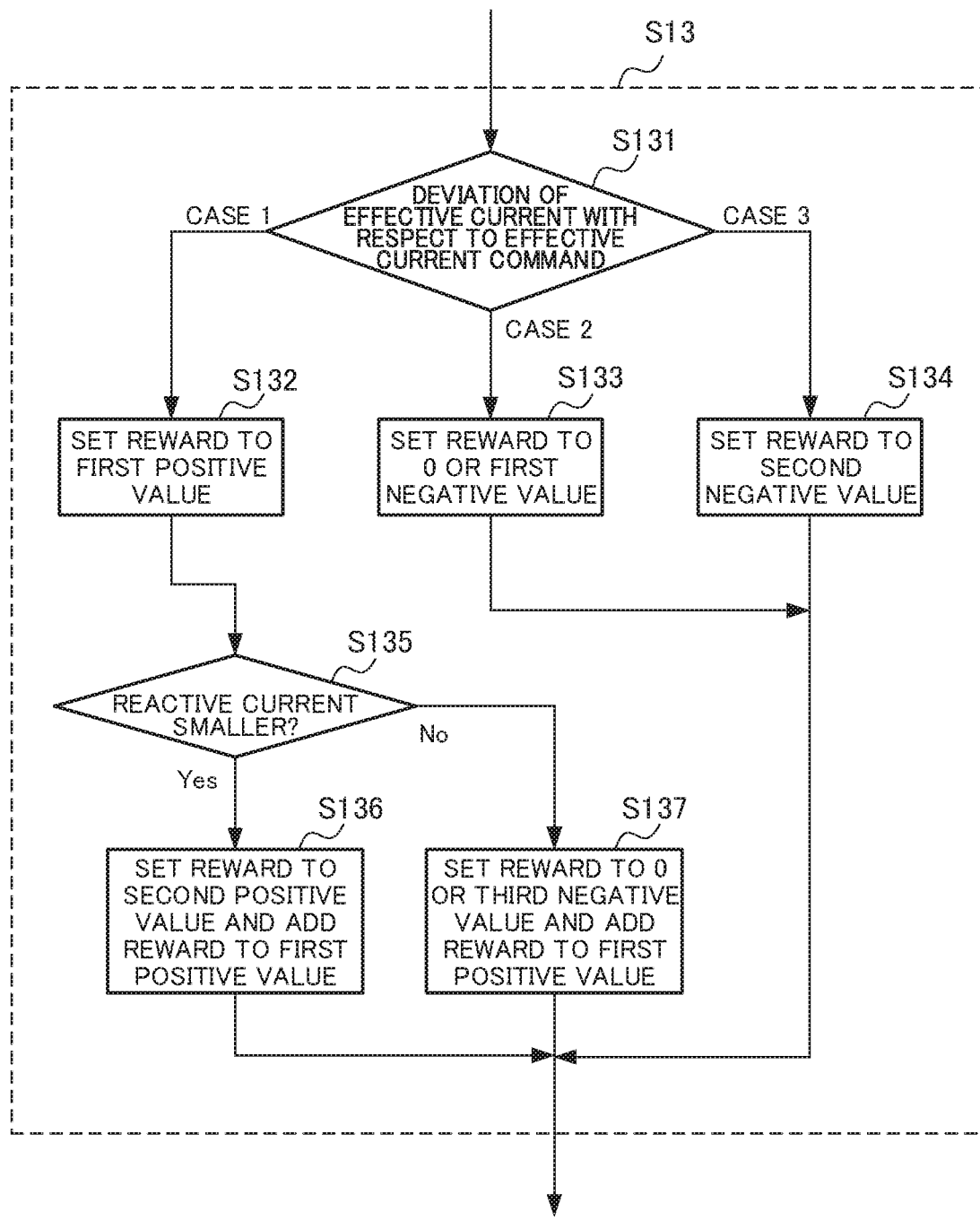
FIG. 5 is a flowchart illustrating a reward calculation method in step S13 of FIG. 4.

Next, an operation of the machine learning device 200 during Q-learning according to the present embodiment will be described with reference to the flowcharts of FIGS. 4 and 5. FIG. 4 is a flowchart illustrating the operation of the machine learning device 200 during Q-learning according to the present embodiment, and FIG. 5 is a flowchart illustrating a reward calculation method in step S13 in FIG. 4.

In step S11, the state information acquisition unit 201 acquires initial state information S from the servo motor controller 100. The acquired state information is output to the value function updating unit 2022 and the action information generation unit 2023. As described above, the state information S is information corresponding to the state in Q-learning and includes a velocity command, an effective current command, an effective current, and a reactive current command at the time point of step S11. The reactive current command at the time point of step S11 is initially set by the user and is stored in the action information generation unit 2023 of the machine learning device 200.

The action information generation unit 2023 generates a reactive current command serving as the action information A and outputs the generated action information A to the servo motor controller 100 via the action information output unit 203. The servo motor controller 100 having received the action information controls the servo motor 400 according to the state S' which uses the reactive current command serving as the action information A on the basis of the position command generated according to a program.

In step S12, the state information acquisition unit 201 acquires state information corresponding to a new state S' from the servo motor controller 100. Here, the new state information includes a velocity command, an effective current command, an effective current, and a reactive current. The state information acquisition unit 201 outputs the acquired state information to the learning unit 202.

In step S13, the reward output unit 2021 of the learning unit 202 calculates a reward on the basis of the effective current command, the effective current, and the reactive current. Step S13 includes steps S131 to S137 as illustrated in FIG. 5. In step S131, the reward output unit 2021 calculates an error L(S') between the effective current and the effective current command in the state S' and determines whether there is no error (L(S')=0) or the error L(S') is within a predetermined range if there is an error L(S'). When there is no error or the error L(S') is within a predetermined range (Case 1), the reward output unit 2021 sets the reward to a first positive value in step S132. When the error L(S') is outside the predetermined range but the error L(S') is smaller than the error L(S) between the effective current and the effective current command in the state S (Case 2), the reward output unit 2021 sets the reward to 0 or a first negative value in step S133. When the error L(S') is outside the predetermined range but the error L(S') is larger than the error L(S) between the effective current and the effective current command in the state S (Case 3), the reward output unit 2021 sets the reward to a second negative value in step S134. The second negative value has a larger absolute value than the first negative value.

After step S132 is performed in step S135, the reward output unit 2021 determines whether the reactive current in the state S' is smaller than the reactive current in the state S. When the reactive current in the state S' is smaller than the reactive current in the state S, the reward output unit 2021 sets the reward to the second positive value and adds the reward to the first positive value in step S136. When the reactive current in the state S' is larger (not smaller) than or is the same as the reactive current in the state S, the reward output unit 2021 sets the reward to 0 or a third negative value and adds the reward to the first positive value in step S137.

As described above, in order to suppress generation of heat due to the reactive current when a voltage saturation does not occur, the reward output unit 2021 can calculate a reward on the basis of the reactive current value and add the calculated reward to the reward based on the error between the effective current and the effective current command. That is, the reward output unit 2021 adds the reward based on the reactive current value in steps S136 and S137 and the reward based on the errors L(S') and L(S) of the effective current in step S132. When two rewards are calculated, the rewards may be weight-added, for example, without being limited to simple addition. Moreover, an average value of the reward based on the reactive current value and the rewards based on the errors L(S') and L(S) of the effective current may be calculated. Although it has been described that steps S135 to S137 are executed later than step S132, the steps may be executed simultaneously with or prior to step S132.

When either one of steps S133, S134, S136, and S137 ends, the value function updating unit 2022 updates the value function Q stored in the value function storage unit 204 on the basis of the value of the reward calculated in the step in step S14.

Subsequently, in step S15, the machine learning device 200 (for example, the action information generation unit 2023) determines whether the program is being executed. Execution of the program can be determined by the action information generation unit 2023 on the basis of the velocity command, for example. If the program is being executed, the action information generation unit 2023 generates a reactive current command serving as new action information in step S16 of FIG. 4 and outputs the generated action information to the servo motor controller 100 via the action information output unit 203, and the flow returns to step S12. The processes of steps S12 to S16 are performed repeatedly until the program ends. When the processes of steps S12 to S16 are performed repeatedly, the value function Q converges to an appropriate value. Although the action information generation unit 2023 ends the process when the program ends, the action information generation unit 2023 may end the process on condition that the processes of step S12 to S16 are performed repeatedly for a predetermined period or a predetermined number of times.

With the operations described with reference to FIGS. 4 and 5, in the present embodiment, by using the machine learning device 200, it is possible to obtain an appropriate value function for adjustment of the reactive current command and simplify optimization of the reactive current command. Next, the operation during generation of the optimization action information, by the optimization action information output unit 205 will be described with reference to the flowchart of FIG. 6. First, in step S21, the optimization action information output unit 205 acquires the value function Q stored in the value function storage unit 204. As described above, the value function Q is updated by the value function updating unit 2022 performing the Q-learning.

In step S22, the optimization action information output unit 205 generates the optimization action information on the basis of the value function Q and outputs the generated optimization action information to the servo motor controller 100.

Figure 6:
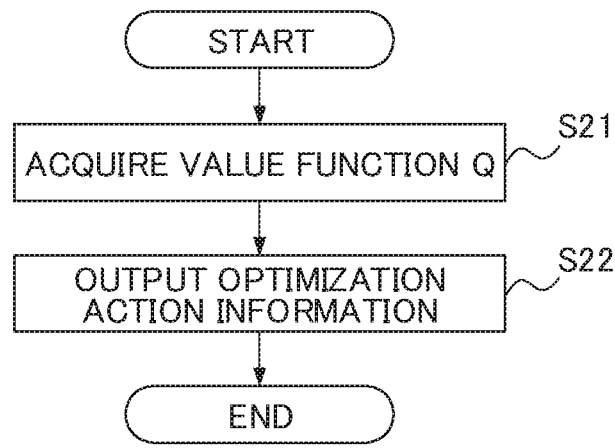
FIG. 6 is a flowchart for describing an operation of an optimization action information output unit of the machine learning device.

In the present embodiment, with the operations described with reference to FIG. 6, the optimization action information is generated on the basis of the value function Q obtained by the machine learning device 200 performing learning. As a result, the servo motor controller 100 can easily adjust the reactive current command set presently on the basis of the optimization action information and avoid saturation of a voltage command with a small reactive current. Moreover, the following ability of the effective current with respect to the effective current command is improved.

The servo motor control unit of the servo motor controller described above and the components included in the machine learning device may be realized by hardware, software or a combination thereof. The servo motor control method performed by cooperation of the components included in the servo motor controller described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)).

The above-described embodiment is a preferred embodiment of the present invention. However, the scope of the present invention is not limited to the embodiment only but the present invention can be embodied in various modifications without departing from the spirit of the present invention.

Figure 7:
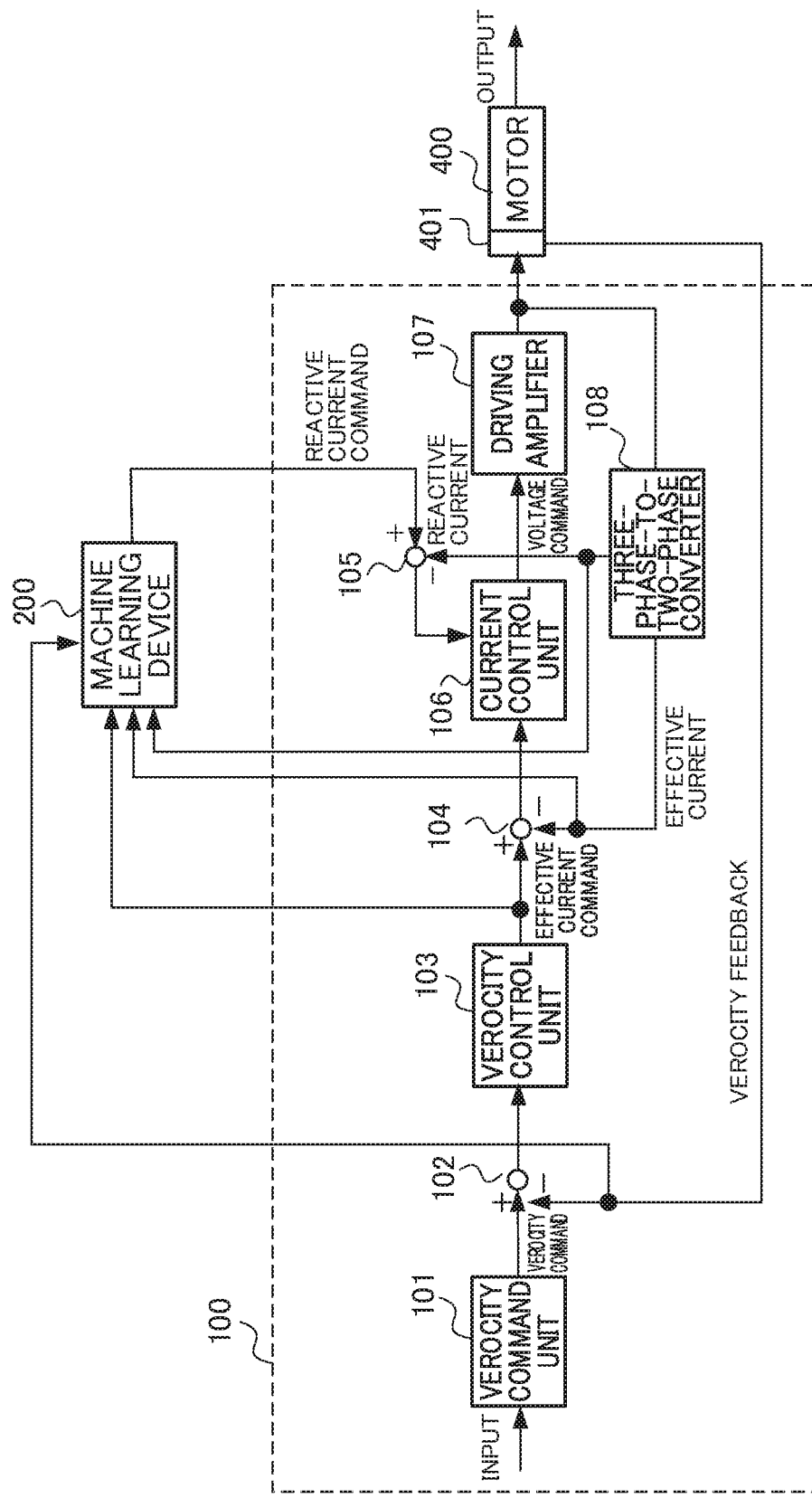
FIG. 7 is a diagram illustrating a motor and a pair made up of a servo motor controller and a machine learning device, illustrating another configuration of the servo motor control system according to the embodiment of the present invention.

For example, in the above-described embodiment, although the machine learning device 200 detects whether the servo motor controller operates under a condition where a voltage saturation occurs on the basis of the velocity command, the machine learning device 200 may detect whether the servo motor controller operates under a condition where a voltage saturation occurs on the basis of a velocity-feedback detection velocity. That is, as illustrated in a servo motor controller of FIG. 7, a detection velocity fed back from the servo motor 200 may be input to the machine learning device 200 instead of the velocity command illustrated in FIG. 2. The servo motor controller 100 illustrated in FIG. 7 has the same configuration and operation as those of the servo motor controller 100 illustrated in FIG. 2 except that a detection velocity is input to the machine learning device 200 instead of the velocity command, and the redundant description thereof will be omitted.

Figure 8:
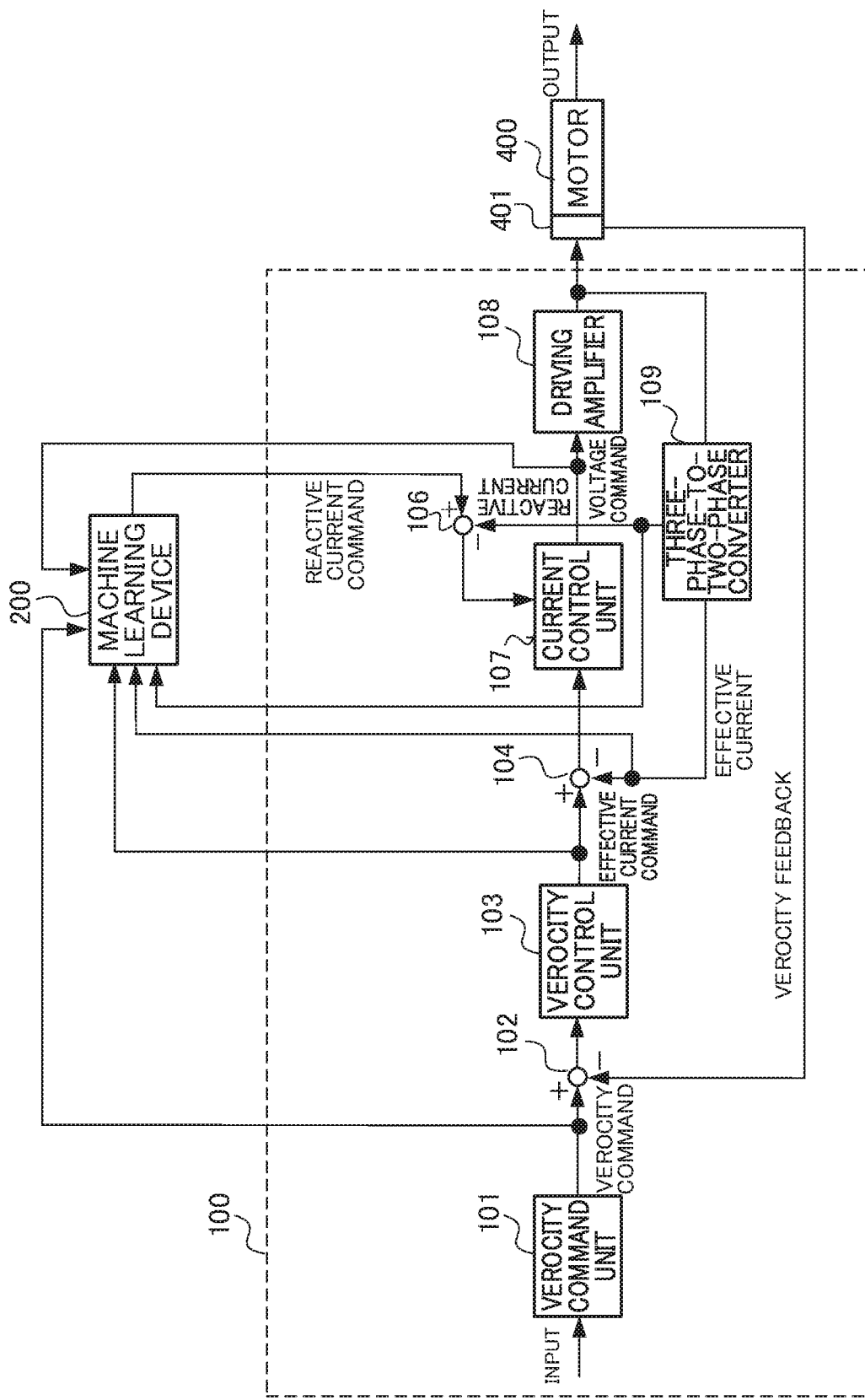
FIG. 8 is a diagram illustrating a motor and a pair made up of a servo motor controller and a machine learning device, illustrating another configuration of the servo motor control system according to the embodiment of the present invention.

Although the voltage saturation in the servo motor controller 100 described above has been detected on the basis of whether the effective current command is not identical to the effective current feedback but an error occurs, the voltage saturation may be detected on the basis of whether the voltage command exceeds a DC link voltage. FIG. 8 is a block diagram of a servo motor controller illustrating an example in which a voltage command is input to the machine learning device 200. The servo motor controller 100 illustrated in FIG. 8 has the same configuration and operation as those of the servo motor controller 100 illustrated in FIG. 2 except that the voltage command is input to the machine learning device 200, and the redundant description thereof will be omitted. The DC link voltage is stored in advance in the reward output unit 2021 of the machine learning device 200, for example.

Figure 9:
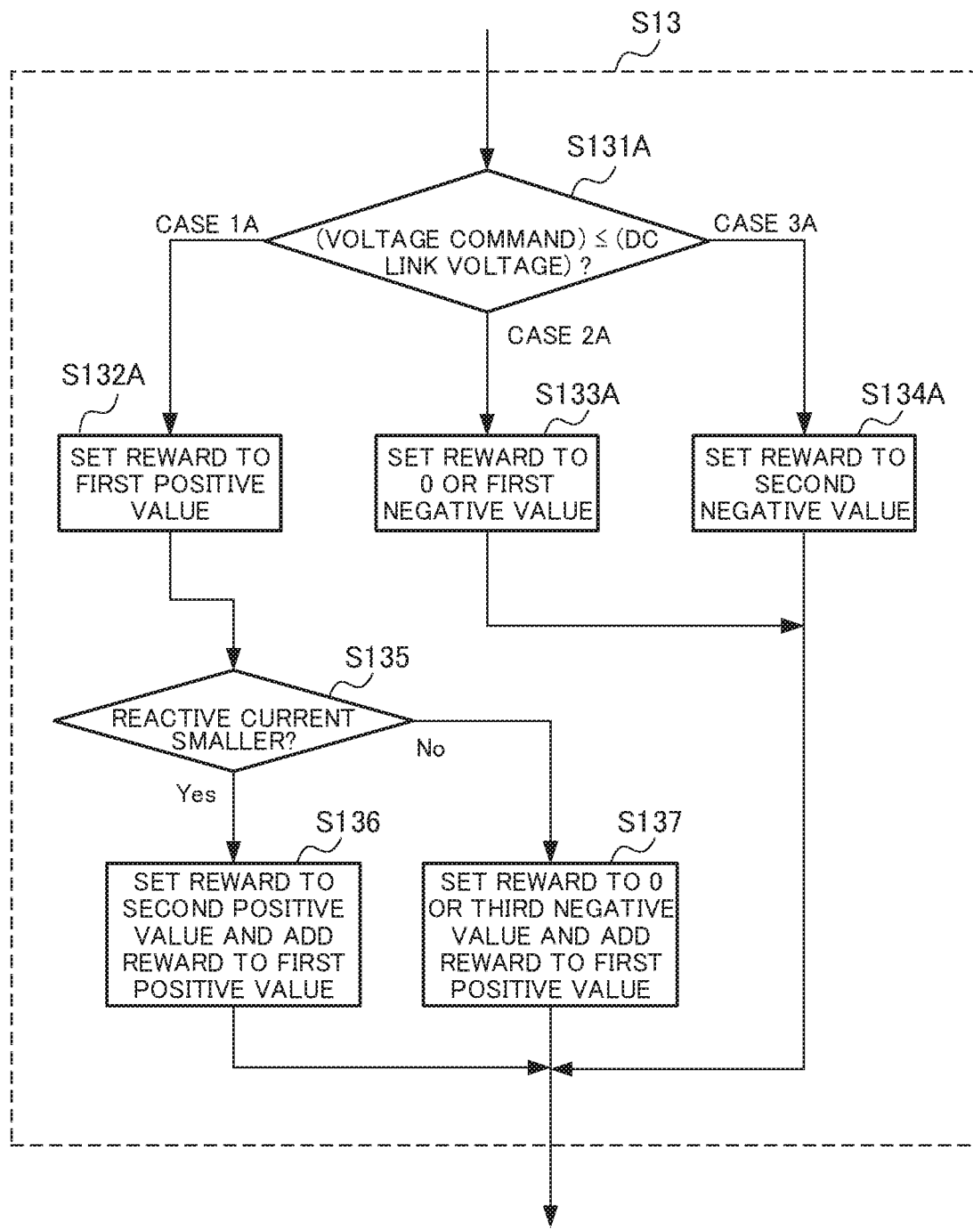
FIG. 9 is a flowchart illustrating a reward calculation method in step S13 of FIG. 4.

The reward output unit 2021 calculates the reward on the basis of whether the voltage command exceeds the DC link voltage in the following manner. FIG. 9 is a flowchart illustrating another reward calculation method in step S13 of FIG. 4. Steps S131A to S134A of the flowchart illustrated in FIG. 9 are different from steps S131 to S134 of the flowchart illustrated in FIG. 5. In FIG. 9, the same steps as those of FIG. 5 will be denoted by the same reference numerals and the redundant description thereof will be omitted. In step S131A, the reward output unit 2021 determines whether the voltage command exceeds the DC link voltage. When the voltage command in the state S' is equal to or smaller than the DC link voltage (Case 1A), the reward output unit 2021 sets the reward to a first positive value in step S132A. When the voltage command in the state S' exceeds the DC link voltage and is smaller than the voltage command value in the state S exceeding the DC link voltage (Case 2A), the reward output unit 2021 sets the reward to 0 or a first negative value in step S133A. When the voltage command in the state S' exceeds the DC link voltage and is larger than the voltage command value in the state S exceeding the DC link voltage (Case 3A), the reward output unit 2021 sets the reward to a second negative value in step S134A. The second negative value has a larger absolute value than the first negative value.

<Modification in which Servo Motor Controller Includes Machine Learning Device>

Although the machine learning device 200 is configured as a device separate from the servo motor controller 100 in the above-described embodiments, some or all of the functions of the machine learning device 200 may be realized by the servo motor controller 100. FIG. 10 is a block diagram illustrating a servo motor controller according to an embodiment of the present invention. As illustrated in FIG. 10, a servo motor controller 100A has the same configuration as the servo motor controller 100 illustrated in FIG. 2 except that it includes a machine learning device 200A. The machine learning device included in the servo motor controller is one form of the machine learning device that performs machine learning with respect to the servo motor controller. In this modification, since the velocity command unit 101, the velocity control unit 103, and the current control unit 106 are provided near the machine learning device 200A, delay of the respective signals of a velocity command, an effective current command, an effective current, and a reactive current is suppressed.

<Freedom in System Configuration>

In the embodiment described above, the machine learning device 200 and the servo motor controller 100 are communicably connected as a one-to-one correlation. However, for example, one machine learning device 200 and a plurality of servo motor controllers 200 may be communicably connected via the network 300 and the machine learning of each of the servo motor controllers 200 may be performed. In this case, a distributed processing system may be adopted, in which respective functions of the machine learning device 200 are distributed to a plurality of servers as appropriate. The functions of the machine learning device 200 may be realized by utilizing a virtual server function, or the like, in a cloud. When there are a plurality of machine learning devices 200-1 to 200-*n* corresponding to a plurality of servo motor controllers 100-1 to 100-*n*, respectively, of the same type name, the same specification, or the same series, the machine learning devices 200-1 to 200-*n* may be configured to share learning results in the machine learning devices 200-1 to 200-*n*. By doing so, more optimal model can be constructed.

EXPLANATION OF REFERENCE NUMERALS

10: Servo motor control system
100: Servo motor controller
101: Velocity command unit
102: Subtractor
103: Velocity control unit
104: Subtractor
105: Subtractor
106: Current control unit
107: Driving amplifier
108: Three-phase-to-two-phase converter
200: Machine learning device
201: State information acquisition unit 202: Learning unit
203: Action information output unit
204: Value function storage unit
205: Optimization action information output unit
300: Network
400: Motor

What is claimed is:

1. A machine learning device that performs machine learning with respect to a servo motor controller configured to convert a three-phase current to a two-phase current of the d- and q-phases to perform current control on a servo motor, the machine learning device comprising:
   a state information acquisition unit configured to acquire, from the servo motor controller, state information including at least velocity or a velocity command, reactive current, and an effective current command and effective current or a voltage command, by causing the servo motor controller to execute a predetermined program;
   an action information output unit configured to output action information including a reactive current command to the servo motor controller;
   a reward output unit configured to output a value of a reward of reinforcement learning based on the voltage command or the effective current command and the effective current included in the state information; and
   a value function updating unit configured to update a value function on the basis of the value of the reward output by the reward output unit, the state information, and the action information.

2. The machine learning device according to claim 1, wherein the reward output unit determines the value of the reward on the basis of whether a voltage saturation occurs.

3. The machine learning device according to claim 2, wherein the voltage saturation is detected on the basis of whether the voltage command exceeds a DC link voltage or an error between the effective current and the effective current command.

4. The machine learning device according to claim 2, wherein the reward output unit determines the reward and determines a reward on the basis of the reactive current value when the voltage saturation does not occur.

5. The machine learning device according to claim 1, further comprising:
   an optimization action information output unit configured to generate and output the reactive current command on the basis of the value function updated by the value function updating unit.

6. A servo motor control system comprising:
   the machine learning device according to claim 1; and
   a servo motor controller configured to convert a three-phase current to a two-phase current of the d- and q-phases to perform current control of a servo motor.

7. A servo motor controller comprising the machine learning device according to claim 1, the servo motor controller converting a three-phase current to a two-phase current of the d- and q-phases to perform current control on a servo motor.

8. A machine learning method of a machine learning device that performs machine learning with respect to a servo motor controller configured to convert a three-phase current to a two-phase current of the d- and q-phases to perform current control on a servo motor, the machine learning method comprising:
   acquiring, from the servo motor controller, state information including at least velocity or a velocity command, reactive current, and an effective current command and effective current or a voltage command, by causing the servo motor controller to execute a predetermined program;
   outputting action information including a reactive current command to the servo motor controller;
   updating a value function on the basis of the state information, the action information, and a value of a reward of reinforcement learning based on the voltage command or the effective current command and the effective current included in the state information.

* * * * *